(12) United States Patent  
Sahasranaman et al.

(10) Patent No.: US 11,870,692 B2  
(45) Date of Patent: Jan. 9, 2024

(54) DYNAMIC PORT FORWARDING

(71) Applicant: ARRIS Enterprises LLC, Suwanee, GA (US)

(72) Inventors: Murali Sahasranaman, Bangalore (IN); Lakshmi Arunkumar, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 43 days.

(21) Appl. No.: 17/097,495

(22) Filed: Nov. 13, 2020

(65) Prior Publication Data

US 2021/0152472 A1 May 20, 2021

Related U.S. Application Data

(60) Provisional application No. 62/937,866, filed on Nov. 20, 2019.

(51) Int. Cl.
*H04L 45/00* (2022.01)
*H04L 45/74* (2022.01)
*H04L 43/16* (2022.01)

(52) U.S. Cl.
CPC .............. *H04L 45/74* (2013.01); *H04L 43/16* (2013.01); *H04L 45/70* (2013.01)

(58) Field of Classification Search
CPC ............. H04L 41/0816; H04L 41/0893; H04L 43/0817; H04L 43/16; H04L 45/70; H04L 45/74; H04L 67/02; H04L 12/2825; H04L 12/2834; H04L 12/66; H04L 43/00; H04L 43/026; H04L 43/10; H04L 43/18; H04L 47/2441; H04L 47/34; H04L 67/42; H04L 12/18; H04L 61/2069; H04L 67/2833; H04L 41/0894

See application file for complete search history.

(56) References Cited

U.S. PATENT DOCUMENTS 7,702,772 B2 * 4/2010 Kurup ................. H04L 67/2819
 709/224
10,284,473 B1 * 5/2019 Sharma .................... H04L 63/20
10,313,905 B2 * 6/2019 Lau ....................... H04W 24/10
(Continued)

FOREIGN PATENT DOCUMENTS

CN   108476423 A * 8/2018 ........... H04B 17/318

*Primary Examiner* — Jay P Patel

(74) *Attorney, Agent, or Firm* — Wenderoth, Lind & Ponack, L.L.P.

(57) ABSTRACT

Methods, systems, and computer readable media can be operable to facilitate dynamic port forwarding. A CPE device may be configured to dynamically modify one or more port forwarding rules based upon a detection of changes at the CPE device, one or more client devices, and/or a local network that is supported by the CPE device. In response to a steering of a client device to a network extender, the CPE device may amend port forwarding rules to forward traffic from the CPE device to the network extender for delivery to the client device. In response to a detection of a low quality parameter value for a first client device, the CPE device may amend port forwarding rules to forward traffic associated with the first client device to a second client device, wherein the second client device is identified as a device supporting interchangeable services with the first client device.

20 Claims, 7 Drawing Sheets

(56) References Cited

U.S. PATENT DOCUMENTS

| | | | | |
|---|---|---|---|---|
| 10,652,776 | B2* | 5/2020 | Lau | H04W 24/10 |
| 11,438,781 | B2* | 9/2022 | Lau | H04L 43/10 |
| 2002/0059170 | A1* | 5/2002 | Vange | H04L 67/42 |
| 2005/0204402 | A1* | 9/2005 | Turley | H04L 63/0263 |
| | | | | 726/11 |
| 2007/0058645 | A1* | 3/2007 | Nannra | H04L 67/289 |
| | | | | 370/401 |
| 2007/0121501 | A1* | 5/2007 | Bryson | H04L 29/06 |
| | | | | 370/252 |
| 2008/0046552 | A1* | 2/2008 | Watson | H04L 41/0681 |
| | | | | 709/224 |
| 2009/0064307 | A1* | 3/2009 | Holar | H04L 63/0209 |
| | | | | 726/12 |
| 2009/0129301 | A1* | 5/2009 | Belimpasakis | H04W 28/18 |
| | | | | 370/310 |
| 2011/0107389 | A1* | 5/2011 | Chakarapani | H04N 17/004 |
| | | | | 725/132 |
| 2013/0095846 | A1* | 4/2013 | Brisebois | H04W 8/22 |
| | | | | 455/456.1 |
| 2013/0148505 | A1* | 6/2013 | Koponen | H04L 61/2592 |
| | | | | 370/235 |
| 2013/0340012 | A1* | 12/2013 | Johnsson | H04N 21/44209 |
| | | | | 725/62 |
| 2014/0059218 | A1* | 2/2014 | Ganu | H04B 17/318 |
| | | | | 709/224 |
| 2014/0147020 | A1* | 5/2014 | Baldwin | G06Q 20/40145 |
| | | | | 382/118 |
| 2015/0019465 | A1* | 1/2015 | Littlejohn | H04B 1/1027 |
| | | | | 455/184.1 |
| 2015/0319034 | A1* | 11/2015 | Zourzouvillys | H04M 7/00 |
| | | | | 370/228 |
| 2016/0112894 | A1* | 4/2016 | Lau | H04W 24/10 |
| | | | | 370/252 |
| 2017/0048144 | A1* | 2/2017 | Liu | H04L 47/2441 |
| 2017/0111214 | A1* | 4/2017 | Zourzouvillys | H04L 41/0663 |
| 2017/0188114 | A1* | 6/2017 | Bibayoff | H04L 69/16 |
| 2017/0289837 | A1* | 10/2017 | Duo | H04L 47/2433 |
| 2017/0332292 | A1* | 11/2017 | Ponnuswamy | H04W 36/00837 |
| 2018/0092026 | A1* | 3/2018 | Patel | H04L 1/1854 |
| 2018/0213463 | A1* | 7/2018 | Cheng | H04W 36/00837 |
| 2018/0343165 | A1* | 11/2018 | Anantharaman | H04L 12/283 |
| 2019/0075469 | A1* | 3/2019 | Mahoney | H04B 17/318 |
| 2019/0208437 | A1* | 7/2019 | Lau | H04L 43/10 |
| 2019/0320385 | A1* | 10/2019 | Bhartia | H04W 28/0831 |
| 2020/0154328 | A1* | 5/2020 | Strater | H04W 40/30 |
| 2020/0267588 | A1* | 8/2020 | Lau | H04L 41/5025 |

* cited by examiner

DYNAMIC PORT FORWARDING

TECHNICAL FIELD

This disclosure relates to dynamic port forwarding.

BACKGROUND

Typically, modems allow users to enable port forwarding and define specific port forwarding rules through a graphical user interface. This allows local client devices connected to the router/modem to provide services that can be accessed from the outside world. For example, a laptop connected to a modem within a customer premise, runs an FTP server and the user can define port forwarding rules to access this FTP server from the external world. This helps the user copy files up and down to this laptop directly from an outside (e.g., office) network or from anywhere in the Internet. The addition of port forwarding rules is typically created as rule entries by the firewall module within the Linux IP Table framework. The Linux kernel reads these rules and applies them to get the rules activated. Typically, these rules are adhered to as defined and little or no additional intelligence is applied when using them. A need exists for improved systems and methods for dynamically controlling port forwarding rules.

BRIEF DESCRIPTION OF THE DRAWINGS

Like reference numbers and designations in the various drawings indicate like elements.

DETAILED DESCRIPTION

It is desirable to improve upon methods and systems for modifying port forwarding rules. Methods, systems, and computer readable media can be operable to facilitate dynamic port forwarding. A CPE device may be configured to dynamically modify one or more port forwarding rules based upon a detection of changes at the CPE device, one or more client devices, and/or a local network that is supported by the CPE device. In response to a steering of a client device to a network extender, the CPE device may amend port forwarding rules to forward traffic from the CPE device to the network extender for delivery to the client device. In response to a detection of a low quality parameter threshold value for a first client device, the CPE device may amend port forwarding rules to forward traffic associated with the first client device to a second client device, wherein the second client device is identified as a device supporting interchangeable services with the first client device.

Figure 1:
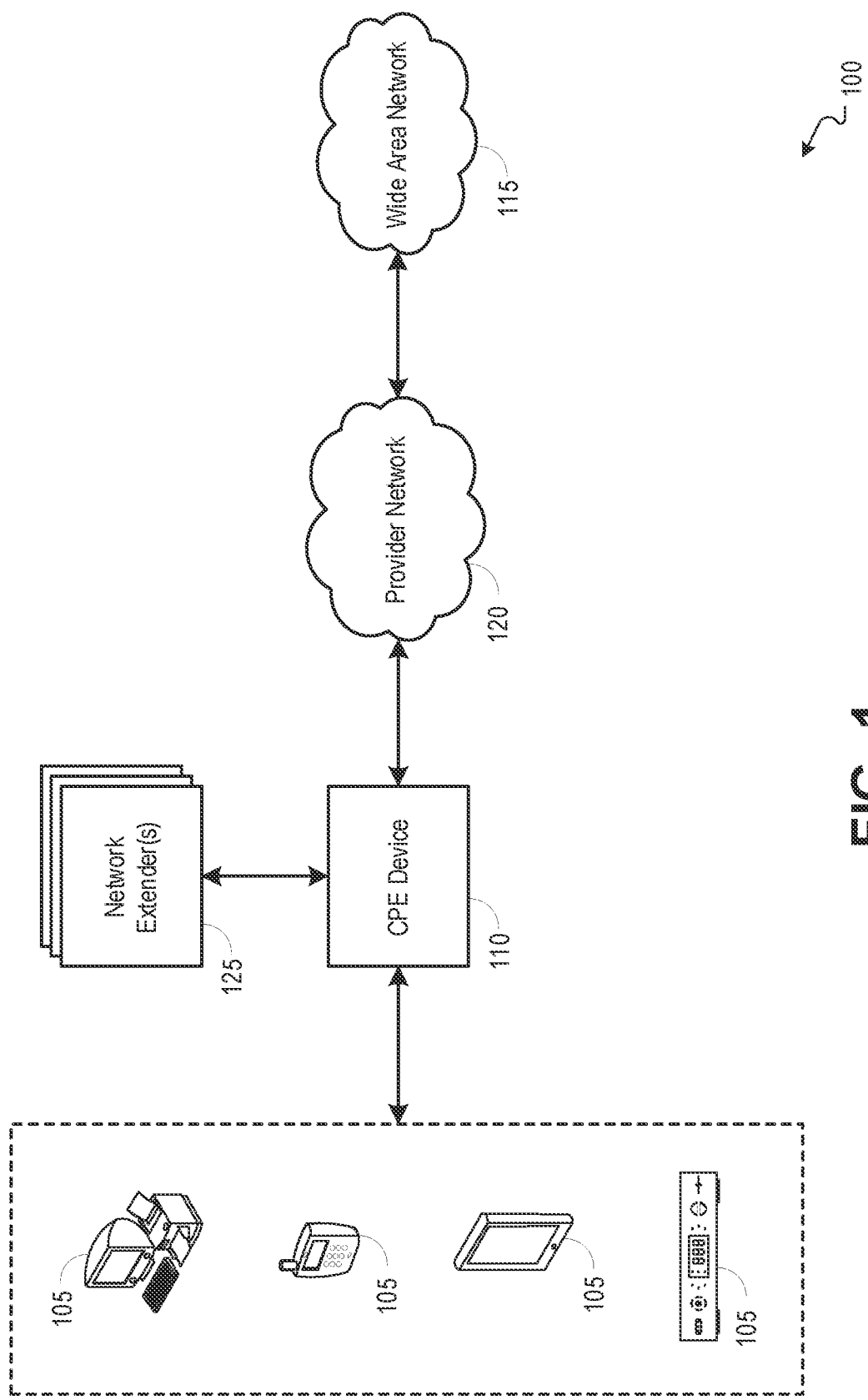
FIG. 1 is a block diagram illustrating an example network environment operable to facilitate dynamic port forwarding.

FIG. 1 is a block diagram illustrating an example network environment 100 operable to facilitate dynamic port forwarding. In embodiments, video, voice, and/or data services may be delivered to one or more client devices 105. Client devices 105 may include televisions, mobile devices, tablets, computers, set-top boxes (STB), telephones (e.g., voice over Internet protocol (VoIP) telephones), gaming devices, IoT (Internet of things) devices (e.g., security cameras, lights, appliances, etc.), and any other device operable to receive video, voice, and/or data services.

In embodiments, one or more services delivered to a subscriber premises may be received and forwarded to one or more client devices 105 by a customer premise equipment (CPE) device 110 such as a gateway device, an access device, a cable modem, a STB, or any other device configured to route communications from an upstream network to one or more connected or associated devices. For example, a CPE device 110 may include a gateway device (e.g., residential gateway, multimedia gateway, etc.), a router, a wireless network extender, or any other device configured to route communications to and from one or more client devices 105. It should be understood that the devices shown in FIG. 1 may be integrated. For example, a client device 105 may be embedded with an access module (e.g., modem) of a CPE device 110.

In embodiments, multiple services (e.g., video, voice, and/or data services) may be delivered from a wide-area network (WAN) 115 to a CPE device 110 through a connection between the CPE device 110 and a provider network 120. The provider network 120 may include an optical network, hybrid fiber coaxial (HFC) network, digital subscriber line (DSL) network, twisted-pair, mobile network, high-speed data network, and others.

In embodiments, multiple services may be delivered from a CPE device 110 to one or more client devices 105 through a local network. The local network may include a local area network (LAN), wireless local area network (WLAN), personal area network (PAN), MoCA network, mobile hotspot network, and others. The local network may be provided at a subscriber premises by the CPE device 110 or one or more other access points within the premises. It will be appreciated by those skilled in the relevant art that delivery of the multiple services over the local network may be accomplished using a variety of standards and formats.

The CPE device 110 may be configured with one or more port forwarding rules, thereby allowing the one or more client devices 105 connected to the CPE device 110 to provide one or more services that may be accessed from a device that is located outside of the local network that is provided by the CPE device 110. In embodiments, the CPE device 110 may be configured to dynamically modify one or more of the port forwarding rules based upon a status, condition, and/or other observed information associated with the CPE device 110, the one or more client devices 105, and/or one or more networks associated with the CPE device 110 (e.g., local network provided by the CPE device 110, the provider network 120, the WAN 115, etc.). For example, to enable dynamic modification of port forwarding rules, the CPE device 110 may include a firewall module with programmed product specific intelligence.

In embodiments, one or more services may be designated at the CPE device 110 as inter-changeable services. For example, the CPE device 110 may be configured to treat a service (e.g., HTTP service) provided by a first device and a service provided by a second device as inter-changeable.

In embodiments, the CPE device 110 may be configured with parameters that control auto-creation and/or amendments to one or more port forwarding rules. For example, the CPE device 110 may be configured with a quality parameter threshold, wherein the CPE device 110 may search for an alternate service provided by another client device 105 when a quality parameter of a client device 105 providing a requested service drops below the quality parameter threshold. The quality parameter of a client device 105 that is monitored may include a RSSI (received signal strength indicator), channel utilization, CPU utilization, or any other parameter that may be utilized to identify a weak connection between a client device 105 and an access point. Likewise, the quality parameter threshold may be an quality parameter threshold, a channel utilization threshold, a CPU utilization threshold, or other parameter threshold. If an alternate service provided by another client device 105 having an RSSI above the quality parameter threshold is found, the CPE device 110 may amend one or more port forwarding rules to enable the client device 105 having the higher RSSI to provide the requested service. As another example, the RSSI may be strong, but the CPE device 110 might detect that a network extender 125 to which the client device 105 is connected, has all the channels overloaded, and so the CPE device 110 may decide to steer the client device 105 to another access point. Another example could be CPU utilization. A client device 105 is connected to the CPE device 110; RSSI is good, channel utilization is reasonable; but for some internal reason the CPU utilization is almost 100% on the CPE device 110. In this example, the CPE device 110 sees this and knows that it cannot serve the client device 105 well enough, so the CPE device 110 may decide to steer the client device 105 to another access point. So, a weak connection between a client device 105 and an access point (e.g., CPE device 110, network extender 125, etc.) could be based on any such factor.

In embodiments, the CPE device 110 may be apart of a connected home network, wherein the CPE device 110 is configured to communicate with one or more network extenders 125. Each of the network extenders 125 may run a DHCP (dynamic host configuration protocol) server and may assign an IP address to each of one or more client devices 105 that are connected to the respective network extender 125. A DHCP server running at the CPE device 110 may assign an IP address to each of the one or more network extenders 125. The CPE device 110 may monitor a quality parameter (e.g., an RSSI) for client devices 105 that are connected to the CPE device 110, and when a quality parameter of a client device 105 drops below a threshold level, the CPE device 110 may steer the client device 105 to connect to a network extender 125 associated with the CPE device 110. After steering the client device 105 to a network extender 125, the CPE device 110 may receive a confirmation from the network extender 125 that the client device 105 has successfully connected to the network extender 125 and that the quality parameter of the connection between the client device 105 and the network extender 125 is greater than a threshold quality parameter. In embodiments, the CPE device 110 may be configured to amend one or more port forwarding rules in response to such a steering of a client device 105 to a new access point (e.g., a new network extender 125). For example, in response to the steering of the client device 105, the CPE device 110 may automatically extend one or more port forwarding rules to reach the network extender 125 and then further to the client device 105 when the client device 105 is connected to the network extender 125. The one or more port forwarding rules may be amended in two places: 1) port forwarding rules may be amended at the CPE device 110 by changing a destination IP address to an IP address of the network extender 125; and 2) a new port forwarding rule may be added on the network extender 125, wherein the port forwarding rule provides that packets are to be forwarded to the new IP address of the client device 105.

The CPE device 110 may monitor a quality parameter (e.g., RSSI) for client devices 105 that are connected to the CPE device 110, and when an quality parameter of a client device 105 drops below a threshold level, the CPE device 110 may steer the client device 105 to connect to a network extender 125 associated with the CPE device 110. After steering the client device 105 to a network extender 125, the CPE device 110 may receive confirmation of the connection between the client device 105 and the network extender 125. However, the CPE device 110 may also receive a notification that the quality parameter value for the client device 105 remains below the threshold quality parameter value. In response to the confirmation of successful connection and notification of the quality parameter value being below the threshold, a second client device 105 having interchangeable services with the first client device 105 may be discovered. If the second client device 105 has a better quality parameter value than the first client device 105, the CPE device 110 may amend its own port forwarding rules to set the IP address of the network extender 125 as the destination IP address, and a new port forwarding rule may be added at the network extender 125, wherein the new port forwarding rule provides that packets are to be forwarded to an IP address of the second client device 105.

In embodiments, the CPE device 110 may be configured with and may identify devices that offer interchangeable services. Since the user configures the CPE device 110 with identifications of which client devices 105 can be interchangeable for which services, this information can be propagated to the network extenders 125 so the network extenders 125 can identify client devices 105 offering interchangeable services. Also, this interchangeability can be a mesh. For example, an HTTP (HyperText Transfer Protocol) service of a first client device 105 may be marked interchangeable with an HTTP Service of a second client device 105. But an FTP (file transfer protocol) service of the first client device 105 may be marked interchangeable with an FTP service of a third client device 105. So, if the user is attempting to access the first client device 105 from the WAN side, if, say an RSSI of the first client device 105 is found too low, then port forwarding is amended depending on the protocol accessed (FTP or HTTP). In this scenario, if HTTP is being accessed then the forwarding happens to the second client device 105, and if FTP is accessed, then the forwarding happens to the third client device.

Steering, as the term is used herein, may be accomplished, as an example by one of two different ways: black-list steering; and BTM (BSS (basic service set) transition management) steering. As an example of black-list steering, assume the CPE device 110 is connected to 3 different network extenders 125 (E1, E2 and E3). A first client device 105 may be currently connected to a 2.4 GHz radio of the CPE device 110. The CPE device 110 decides to steer the first client device 105 to a 2.4 GHz radio of a network extender 125 (say for example, E2) for some specific reason. The CPE device 110 may first ask the other network extenders 125 (e.g., E1 and E3) to black-list a MAC address of the client device 105 within their ACL (Access Control List).

This will prevent the first client device 105 from hooking to the other network extenders 125 at any time. Then, the CPE device 110 may ask the specific network extender 125 (e.g., E2) to whitelist (allow) a MAC address of the first client device 105 within its ACL. As the last step, the CPE device 110 itself may black list a MAC address of the first client device 105. Now, the first client device 105 gets disconnected from the CPE device 110, and it attempts to reconnect. Since the first client device 105 is blacklisted everywhere except the certain network extender 125 (e.g., E2), it automatically gets connected to the specific network extender 125 only. Since all the network extenders 125 host the same SSID and passwords as the CPE device 110, this is possible. Now, after some time the CPE device 110 decides to steer the first client device 105 from the certain network extender 125 (E2) to a different network extender 125 (say, for example, E3) for some reason. The same procedure as provided above may be employed. The remaining network extender 125 (e.g., E1) is asked to blacklist a MAC address of the first client device 105. The different network extender 125 (E3) is asked to whitelist a MAC address of the first client device 105. The CPE device 110 itself has a MAC address of the first client device 105 black-listed. Now, the specific network extender 125 (E2) to whom the first client device 105 is already connected, is asked to blacklist a MAC address of the first client device 105. At this stage, the first client device 105 gets disconnected from the specific network extender 125 (E2), and the first client device 105 gets automatically hooked to the different network extender (E3) as only E3 has whitelisted the MAC address of the first client device 105. Thus, blacklisting helps to steer client devices 105 to targeted/designated CPE device 110 or network extenders 125.

BTM Steering may provide a more efficient method of steering. There are less overheads when this approach is used. BTM steering places more reliance on the client to do the steering. Consider the same case as above, in which there is a CPE device 110 with three network extenders 125 (E1, E2 and E3). A first client device 105 is connected to the CPE device 110. As an example of BTM steering, if the CPE device 110 wants to steer the first client device 105 to a specific network extender (say, for example, E2) for some reason, the CPE device 110 will simply make a BTM frame (this is a type of wireless packet that lists all the available APs like CPE device 110, network extenders 125 (E1, E2, E3), etc., and marks a preferred AP for that specific client device 105—E2 in this case) and send this frame to the first client device 105. Upon receiving this, the client device 105 parses the information and understands that it is expected to hook on to the identified network extender 125 (E2). The first client device 105 would obey this command—it will disconnect from the current AP (e.g., CPE device 110) and attempt to connect to the specific network extender 125 (E2) by using the BSSD of the specific network extender 125 (E2) (marked in the frame). With all SSIDs being the same, the first client device 105 cannot know which AP is the specific network extender 125 (E2). The BSSID is a unique MAC address like string associated with each AP. The BSSID of the preferred AP is mentioned in the BTM frame. Using this information, the first client device 105 would connect to the specific network extender 125 (E2) on its own.

Figure 2:
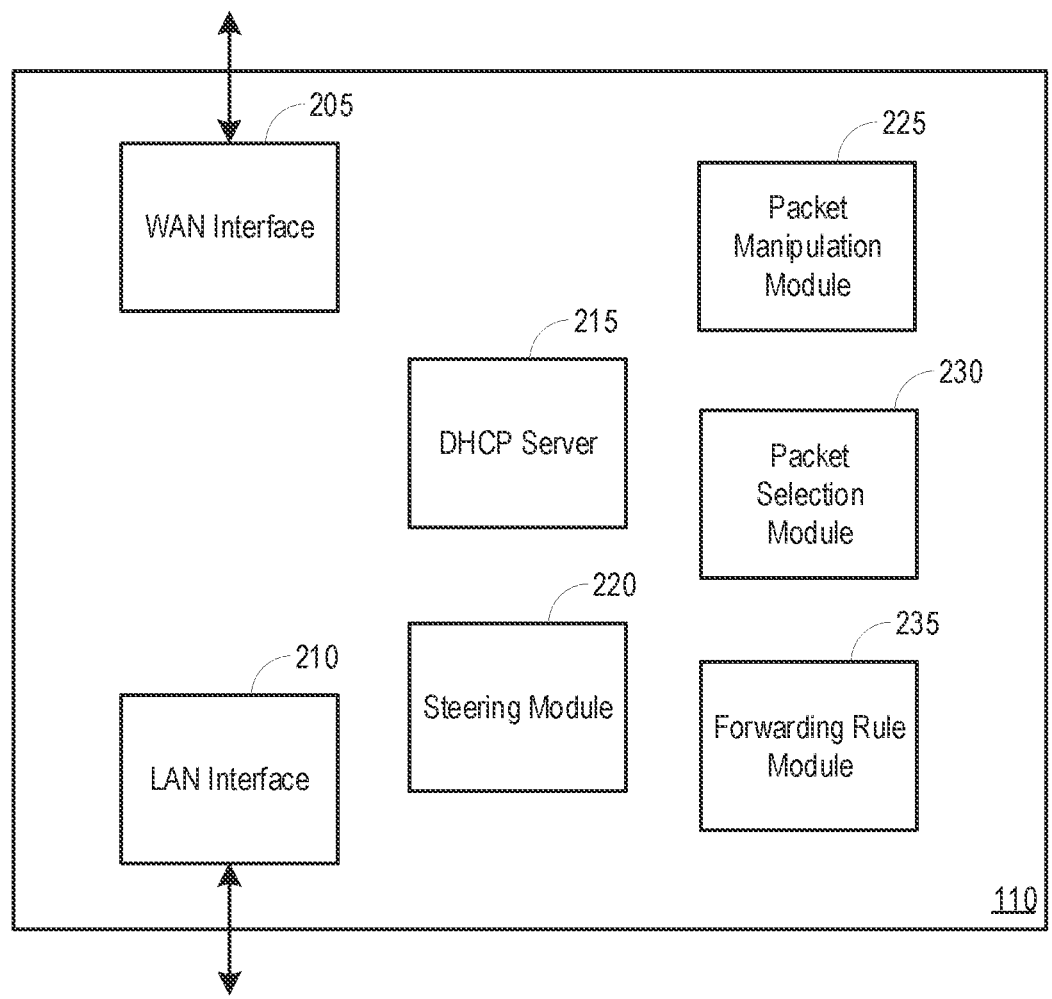
FIG. 2 is a block diagram illustrating an example CPE device operable to facilitate dynamic port forwarding.

FIG. 2 is a block diagram illustrating an example CPE device 110 operable to facilitate dynamic port forwarding. The CPE device 110 may include a WAN interface 205, one or more LAN interfaces 210, a DHCP server 215, a steering module 220, a packet manipulation module 225, a packet selection module 230, and a forwarding rule module 235. The CPE device 110 may receive one or more services and/or communications from one or more other routing or access devices or upstream network elements (e.g., WAN 115 of FIG. 1, etc.) through the WAN interface 205, and the CPE device 110 may forward one or more services and/or communications to one or more client devices 105 of FIG. 1 and/or network extenders 125 of FIG. 1 through the LAN interface(s) 210.

The forwarding rule module 235 may be configured with one or more port forwarding rules, and the forwarding rule module 235 may be configured to dynamically modify one or more of the port forwarding rules based upon a status, condition, and/or other observed information associated with the CPE device 110, one or more client devices 105 of FIG. 1, and/or one or more networks associated with the CPE device 110 (e.g., local network provided by the CPE device 110, the provider network 120 of FIG. 1, the WAN 115 of FIG. 1, etc.). For example, the forwarding rule module 235 may be configured with programmed product specific intelligence.

In embodiments, one or more services may be designated at the forwarding rule module 235 as inter-changeable services. For example, the forwarding rule module 235 may be configured to treat a service (e.g., HTTP service) provided by a first device and a service provided by a second device as inter-changeable.

In embodiments, the forwarding rule module 235 may be configured with parameters that control auto-creation and/or amendments to one or more port forwarding rules. For example, the forwarding rule module 235 may be configured with a quality parameter threshold (e.g., an RSSI (received signal strength indicator) threshold), wherein the forwarding rule module 235 may search for an alternate service provided by another client device when a quality parameter (e.g., an RSSI) of a client device providing a requested service drops below the quality parameter threshold. If an alternate service provided by another client device having a quality parameter above the quality parameter threshold is found, the forwarding rule module 235 may amend one or more port forwarding rules to enable the client device having the higher quality parameter to provide the requested service.

In embodiments, the packet selection module 230 layered on top of the packet manipulation module 225 (e.g., IP tables) may enable callback functions to be attached to network events registered as hooks.

In embodiments, a DHCP server 215 may assign an IP address to each of one or more network extenders 125 of FIG. 1. The steering module 220 may be configured to steer a client device to a network extender.

Figure 3:
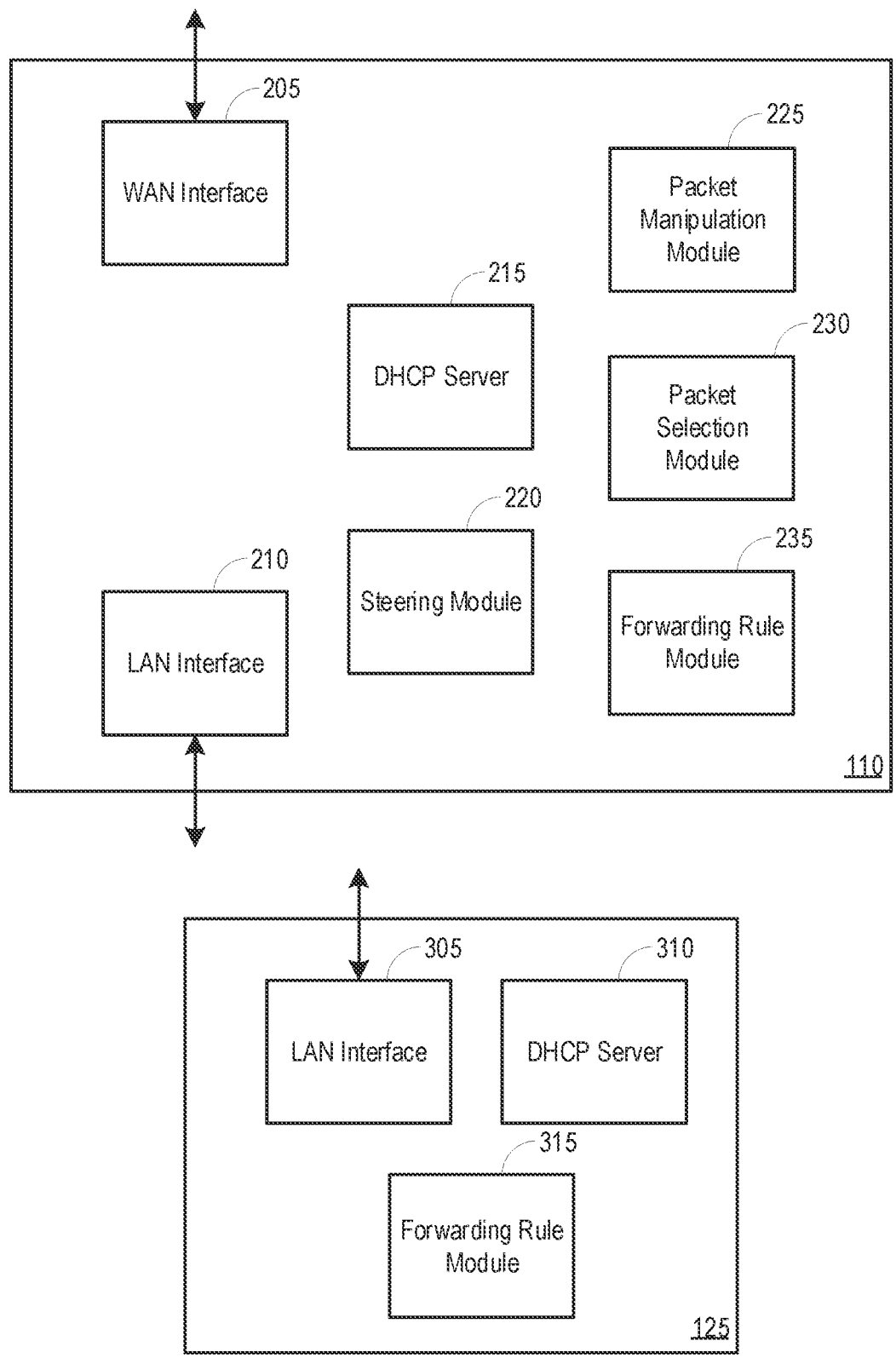
FIG. 3 is a block diagram illustrating an example CPE device and network extender operable to facilitate dynamic port forwarding.

FIG. 3 is a block diagram illustrating an example CPE device 110 and network extender 125 operable to facilitate dynamic port forwarding. The CPE device 110 may include a WAN interface 205, one or more LAN interfaces 210, a DHCP server 215, a steering module 220, a packet manipulation module 225, a packet selection module 230, and a forwarding rule module 235. The CPE device 110 may receive one or more services and/or communications from one or more other routing or access devices or upstream network elements (e.g., WAN 115 of FIG. 1, etc.) through the WAN interface 205, and the CPE device 110 may forward one or more services and/or communications to one or more client devices 105 of FIG. 1 and/or network extender 125 through the LAN interface(s) 210. The network extender 125 may include one or more LAN interfaces 305, a DHCP server 310, and a forwarding rule module 315. The network extender 125 may receive one or more services and/or communications from the CPE device 110 and/or one or more other network extenders 125 through the LAN interface(s) 305, and the network extender 125 may forward one or more services and/or communications to one or more client devices 105 of FIG. 1 and/or other network extenders 125 through the LAN interface(s) 305.

In embodiments, one or more services may be designated at the forwarding rule module 235 as inter-changeable services. For example, the forwarding rule module 235 may be configured to treat a service (e.g., HTTP service) provided by a first device and a service provided by a second device as inter-changeable.

In embodiments, the forwarding rule module 235 may be configured with parameters that control auto-creation and/or amendments to one or more port forwarding rules. For example, the forwarding rule module 235 may be configured with a quality parameter threshold (e.g., an RSSI (received signal strength indicator) threshold), wherein the forwarding rule module 235 may search for an alternate service provided by another client device when a quality parameter (e.g., RSSI) of a client device providing a requested service drops below the quality parameter threshold. If an alternate service provided by another client device having a quality parameter above the quality parameter threshold is found, the forwarding rule module 235 may amend one or more port forwarding rules to enable the client device having the higher quality parameter to provide the requested service.

In embodiments, the packet selection module 230 layered on top of the packet manipulation module 225 (e.g., IP tables) may enable callback functions to be attached to network events registered as hooks.

In embodiments, a DHCP server 215 may assign an IP address to each of one or more network extenders 125 of FIG. 1. For example, the DHCP server 215 may assign an IP address to the network extender 125. The steering module 220 may be configured to steer a client device to a network extender.

In embodiments, the CPE device 110 may be apart of a connected home network, wherein the CPE device 110 is configured to communicate with a network extender 125. The network extender 125 may run a DHCP server 310 and may assign an IP address to each of one or more client devices 105 of FIG. 1 that are connected to the network extender 125.

The steering module 220 may monitor a quality parameter (e.g., an RSSI) for client devices 105 that are connected to the CPE device 110, and when a quality parameter (e.g., RSSI) of a client device 105 drops below a threshold level, the steering module 220 may steer the client device 105 to connect to a network extender 125 associated with the CPE device 110. After steering the client device 105 to the network extender 125, the steering module 220 may receive a confirmation from the network extender 125 that the client device 105 has successfully connected to the network extender 125 and that the quality parameter (e.g., RSSI) of the connection between the client device 105 and the network extender 125 is greater than a threshold quality parameter. In embodiments, the forwarding rule module 235 may be configured to amend one or more port forwarding rules in response to such a steering of a client device 105 to the network extender 125. For example, in response to the steering of the client device 105, the forwarding rule module 235 may automatically extend one or more port forwarding rules to reach the network extender 125 and then further to the client device 105 when the client device 105 is connected to the network extender 125. The forwarding rule module 235 may amend port forwarding rules at the CPE device 110 by changing a destination IP address to the IP address of the network extender 125. For example, on completion of the steering, an IP table rule on the CPE device 110 may be immediately edited to re-direct incoming packets for the client device 105 over to the network extender 125 as the destination IP address, forwarded on the same port. In response to the steering of the client device 105, the forwarding rule module 315 may create a new port forwarding rule at the network extender 125, wherein the port forwarding rule provides that packets are to be forwarded to the IP address of the client device 105. For example, on completion of the steering, the forwarding rule module 315 may add a new rule on IP tables at the network extender 125 to redirect incoming packets to the network extender 125 destination port over to the IP address of the client device 105.

The steering module 220 may monitor a quality parameter (e.g., an RSSI) for client devices 105 that are connected to the CPE device 110, and when a quality parameter of a client device 105 drops below a threshold level, the steering module 220 may steer the client device 105 to connect to a network extender 125 associated with the CPE device 110. After steering the client device 105 to the network extender 125, the steering module 220 may receive confirmation of the connection between the client device 105 and the network extender 125. However, the steering module 220 may also receive a notification that the quality parameter for the client device 105 remains below the threshold quality parameter value. In response to the confirmation of successful connection and notification of the quality parameter being below the threshold, a second client device 105 having interchangeable services with the first client device 105 may be discovered by the forwarding rule module 235. If the second client device 105 has a better quality parameter value than the first client device 105, the forwarding rule module 235 may amend port forwarding rules at the CPE device 110 to set the IP address of the network extender 125 as the destination IP address (e.g., the forwarding rule module 235 may edit IP tables at the CPE device 110), and the forwarding rule module 315 may add a new port forwarding rule at the network extender 125 (e.g., the forwarding rule module 315 may add the new rule within IP tables at the network extender 125), wherein the new port forwarding rule provides that packets are to be forwarded to an IP address of the second client device 105. It should be understood that the port forwarding rules may be edited at the CPE device 110 before the quality parameter value for the second client device 105 is checked.

In embodiments, the forwarding rule module 315 of the network extender 125 may receive an identification of interchangeable services and corresponding client device 105 from the forwarding rule module 235 of the CPE device 110.

Figure 4:
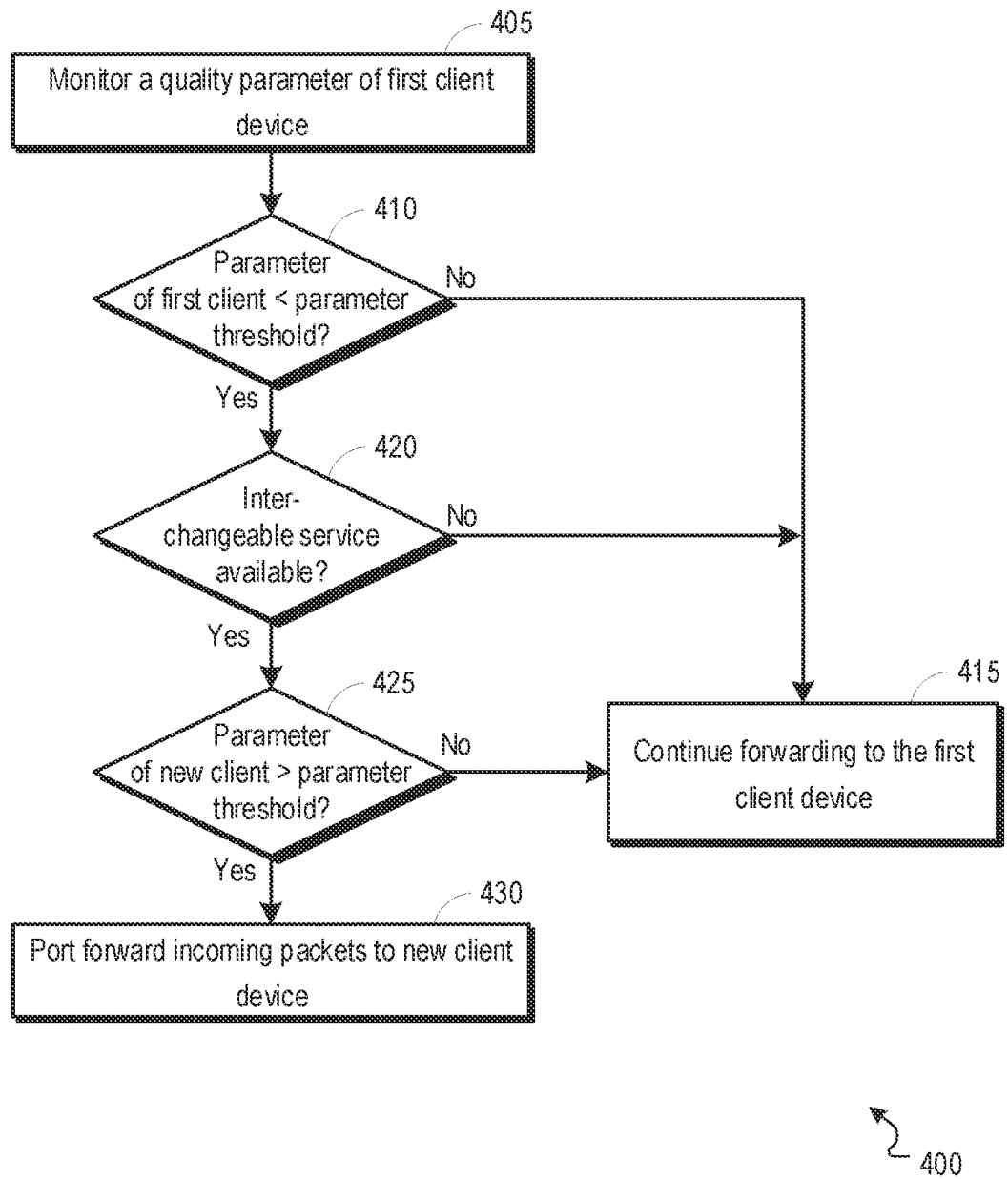
FIG. 4 is a flowchart illustrating an example process operable to facilitate the dynamic port forwarding of packets based upon an availability of interchangeable services.

FIG. 4 is a flowchart illustrating an example process 400 operable to facilitate the dynamic port forwarding of packets based upon an availability of interchangeable services. The process 400 can begin at 405, when a quality parameter (e.g., an RSSI) of a first client device is monitored. For example, a CPE device 110 of FIG. 1 may be configured to deliver a service to a first client device (e.g., a client device 105 of FIG. 1), wherein one or more packets associated with the service are forwarded to the first client device from the CPE device 110. In embodiments, the CPE device 110 may monitor the RSSI of the first client device while the first client device is connected to the CPE device 110.

At 410, a determination may be made whether the quality parameter of the first client device is less than a quality parameter threshold. For example, the CPE device 110 may be configured with a quality parameter threshold (e.g., minimum RSSI). It should be understood that the CPE device 110 may be configured with a default quality parameter threshold, an quality parameter threshold for each of one or more client devices or device types, and/or an quality parameter threshold for each of one or more services provided by the CPE device 110. The CPE device 110 may identify a quality parameter threshold associated with the first client device and/or a service provided from the CPE device 110 to the first client device, and the CPE device 110 may compare the current quality parameter of the first client device to the identified quality parameter threshold.

If, at 410, the determination is made that the quality parameter of the first client device is not less than the quality parameter threshold, the process 400 may proceed to 415. At 415, the CPE device 110 may continue to forward packets to the first client device.

If, at 410, the determination is made that the quality parameter of the first client device is less than the quality parameter threshold, the process 400 may proceed to 420. At 420, a determination may be made whether an interchangeable service for a service provided by the CPE device 110 to the first client device is available. In embodiments, one or more services may be designated at the CPE device 110 as inter-changeable services. For example, the CPE device 110 (or a network extender 125 of FIG. 1) may be configured to treat a service (e.g., HTTP service) provided by the first client device and a service provided by a second client device as inter-changeable.

If, at 420, the determination is made that no interchangeable service for the service provided by the CPE device 110 to the first client device is available, the CPE device 110 may continue to forward packets to the first client device at 415.

If, at 420, the determination is made that an interchangeable service for the service provided by the CPE device 110 to the first client device is available, the process 400 may proceed to 425. For example, the CPE device 110 may identify a second client device that is available to provide a service that is designated at the CPE device 110 as an interchangeable service for the service provided by the CPE device 110 to the first client device. At 425, a determination may be made whether a quality parameter of the second client device is greater than a quality parameter threshold. For example, the quality parameter threshold may be based upon a quality parameter of the first client device (e.g., the RSSI of the first client device may be used as the quality parameter threshold), or the quality parameter threshold may be a value that is configured at the CPE device 110 as a default quality parameter threshold or a quality parameter threshold associated with a particular client device and/or service.

If, at 425, the determination is made that the quality parameter of the second client device is not greater than the quality parameter threshold, the CPE device 110 may continue to forward packets to the first client device at 415.

If, at 425, the determination is made that the quality parameter of the second client device is greater than the quality parameter threshold, the process 400 may proceed to 430. At 430, incoming packets may be port forwarded to the second client device. In embodiments, the CPE device 110 may begin forwarding incoming packets associated with the service provided for the first client device to the second client device. The CPE device 110 may amend one or more port forwarding rules to enable the second client device to provide the service. For example, the CPE device 110 may amend one or more port forwarding rules by changing a forwarding destination address from an address (e.g., IP address) associated with the first client device to an address associated with the second client device.

Figure 5:
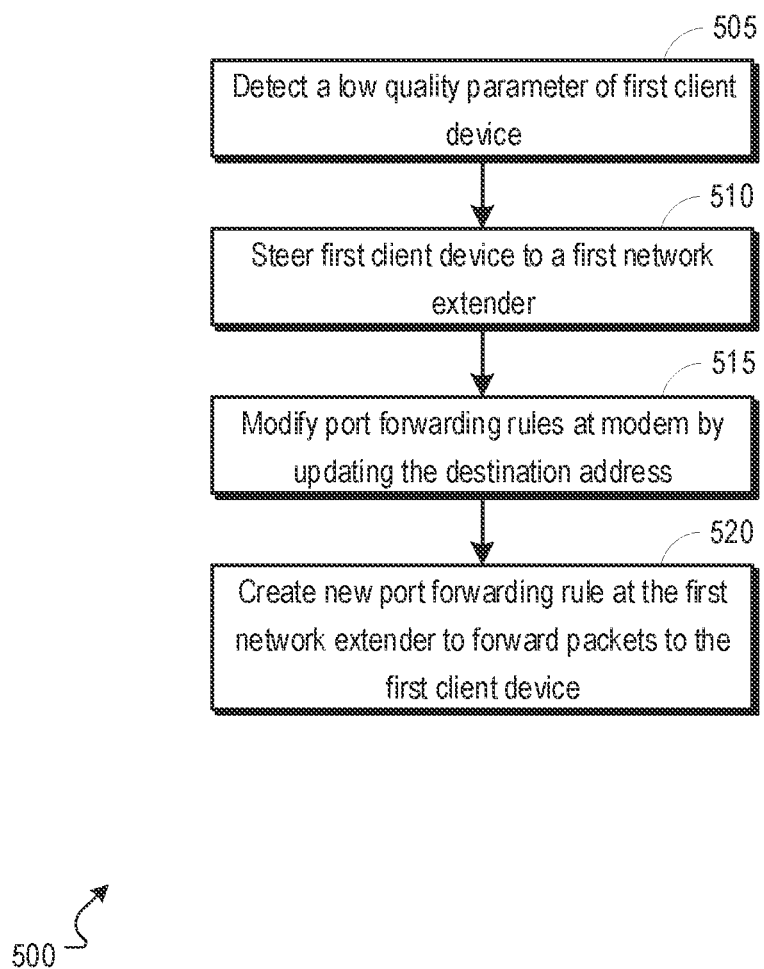
FIG. 5 is a flowchart illustrating an example process operable to facilitate the modification of port forwarding rules in response to a steering of a client device to a network extender.

FIG. 5 is a flowchart illustrating an example process 500 operable to facilitate the modification of port forwarding rules in response to a steering of a client device to a network extender. The process 500 can begin at 505, when a low RSSI of a first client device is detected. A CPE device 110 of FIG. 1 may be configured to deliver one or more services and/or communications to a first client device (e.g., a client device 105 of FIG. 1), wherein one or more packets associated with the service(s) and/or communication(s) are forwarded to the first client device from the CPE device 110. In embodiments, the CPE device 110 may monitor a quality parameter (e.g., the RSSI) of the first client device while the first client device is connected to the CPE device 110. The CPE device 110 may detect the quality parameter of the first client device dropping below a certain level or value. For example, the CPE device 110 may be configured with a quality parameter threshold (e.g., minimum RSSI). It should be understood that the CPE device 110 may be configured with a default quality parameter threshold, a quality parameter threshold for each of one or more client devices or device types, and/or an quality parameter threshold for each of one or more services provided by the CPE device 110. The CPE device 110 may identify a quality parameter threshold associated with the first client device and/or a service provided from the CPE device 110 to the first client device, and the CPE device 110 may compare the current quality parameter of the first client device to the identified quality parameter threshold. The CPE device 110 may detect a low quality parameter of the first client device when the current quality parameter of the first client device is less than an identified quality parameter threshold.

At 510, the first client device may be steered to a first network extender. For example, the CPE device 110 may steer the first client device to communicate with the first network extender (e.g., a network extender 125 of FIG. 1). In embodiments, the CPE device 110 may output a communication to the first client device, wherein the communication includes an identification of the first network extender and instructions for connecting to (e.g., or otherwise initiating communications with the first network extender) the first network extender.

At 515, port forwarding rules of a modem at the CPE device 110 may be modified by updating the destination address for forwarding packets to the first client device. In response to the steering of the first client device, the CPE device 110 may automatically extend one or more port forwarding rules to reach the first network extender and then further to the first client device when the first client device is connected to the first network extender. For example, one or more port forwarding rules may be amended at the CPE device 110 by changing a destination IP address to an IP address of the first network extender.

At 520, one or more new port forwarding rules may be created at the first network extender to forward packets to the first client device. For example, a new port forwarding rule may be added on the first network extender, wherein the port forwarding rule provides that packets are to be forwarded to the new IP address of the first client device.

Figure 6:
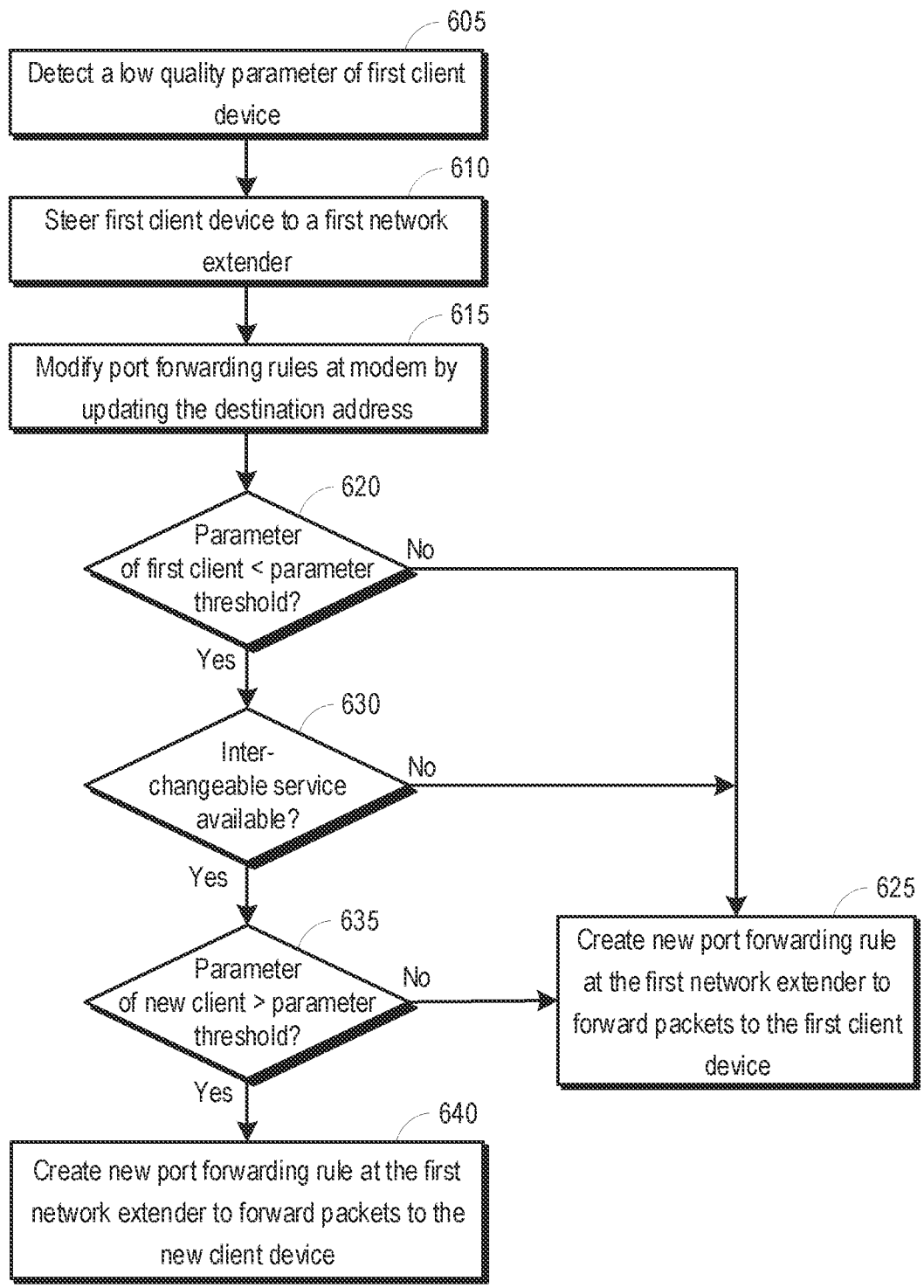
FIG. 6 is a flowchart illustrating an example process operable to facilitate the modification of port forwarding rules in response to a steering of a client device to a network extender and changes in quality parameters.

FIG. 6 is a flowchart illustrating an example process 600 operable to facilitate the modification of port forwarding rules in response to a steering of a client device to a network extender and changes in quality parameter values. The process 600 can begin at 605, when a low quality parameter of a first client device is detected. A CPE device 110 of FIG. 1 may be configured to deliver one or more services and/or communications to a first client device (e.g., a client device 105 of FIG. 1), wherein one or more packets associated with the service(s) and/or communication(s) are forwarded to the first client device from the CPE device 110. In embodiments, the CPE device 110 may monitor the RSSI of the first client device while the first client device is connected to the CPE device 110. The CPE device 110 may detect the quality parameter of the first client device dropping below a certain level or value. For example, the CPE device 110 may be configured with a quality parameter threshold (e.g., minimum RSSI). It should be understood that the CPE device 110 may be configured with a default quality parameter threshold, a quality parameter threshold for each of one or more client devices or device types, and/or an quality parameter threshold for each of one or more services provided by the CPE device 110. The CPE device 110 may identify a quality parameter threshold associated with the first client device and/or a service provided from the CPE device 110 to the first client device, and the CPE device 110 may compare the current quality parameter of the first client device to the identified quality parameter threshold. The CPE device 110 may detect a low quality parameter of the first client device when the current RSSI of the first client device is less than an identified quality parameter threshold.

At 610, the first client device may be steered to a first network extender. For example, the CPE device 110 may steer the first client device to communicate with the first network extender (e.g., a network extender 125 of FIG. 1). In embodiments, the CPE device 110 may output a communication to the first client device, wherein the communication includes an identification of the first network extender and instructions for connecting to (e.g., or otherwise initiating communications with the first network extender) the first network extender.

At 615, port forwarding rules of a modem at the CPE device 110 may be modified by updating the destination address for forwarding packets to the first client device. In response to the steering of the first client device, the CPE device 110 may automatically extend one or more port forwarding rules to reach the first network extender and then further to the first client device when the first client device is connected to the first network extender. For example, one or more port forwarding rules may be amended at the CPE device 110 by changing a destination IP address to an IP address of the first network extender.

At 620, a determination may be made whether the quality parameter of the first client device is less than a quality parameter threshold. For example, the CPE device 110 may be configured with a quality parameter threshold (e.g., minimum RSSI). It should be understood that the CPE device 110 may be configured with a default quality parameter threshold, a quality parameter threshold for each of one or more client devices or device types, and/or an quality parameter threshold for each of one or more services provided by the CPE device 110. The CPE device 110 may receive an indication of the quality parameter of the first client device from a communication that is received from the first network extender. The CPE device 110 may identify a quality parameter threshold associated with the first client device and/or a service provided from the CPE device 110 to the first client device, and the CPE device 110 may compare the current quality parameter of the first client device to the identified quality parameter threshold.

If, at 620, the determination is made that the quality parameter of the first client device is not less than the quality parameter threshold, the process 600 may proceed to 625. At 625, a new port forwarding rule may be created at the first network extender to forward packets to the first client device. For example, a new port forwarding rule may be added at the first network extender, wherein the port forwarding rule provides that packets are to be forwarded to the new IP address of the first client device.

If, at 620, the determination is made that the quality parameter of the first client device is less than the quality parameter threshold, the process 600 may proceed to 630. At 630, a determination may be made whether an interchangeable service for a service provided to the first client device is available. In embodiments, one or more services may be designated at the CPE device 110 as inter-changeable services. For example, the CPE device 110 may be configured to treat a service (e.g., HTTP service) provided by the first client device and a service provided by a second client device as inter-changeable.

If, at 630, the determination is made that no interchangeable service for the service provided to the first client device is available, a new port forwarding rule may be created at the first network extender to forward packets to the first client device at 625.

If, at 630, the determination is made that an interchangeable service for the service provided to the first client device is available, the process 600 may proceed to 635. For example, the CPE device 110 (or a network extender 125 of FIG. 1) may identify a second client device that is available to provide a service that is designated at the CPE device 110 as an interchangeable service for the service provided to the first client device. At 635, a determination may be made whether a quality parameter of the second client device is greater than an quality parameter threshold. For example, the quality parameter threshold may be based upon a quality parameter of the first client device (e.g., the RSSI of the first client device may be used as the quality parameter threshold), or the quality parameter threshold may be a value that is configured at the CPE device 110 as a default quality parameter threshold or an quality parameter threshold associated with a particular client device and/or service.

If, at 635, the determination is made that the quality parameter of the second client device is not greater than the quality parameter threshold, a new port forwarding rule may be created at the first network extender to forward packets to the first client device at 625.

If, at 635, the determination is made that the quality parameter of the second client device is greater than the quality parameter threshold, the process 600 may proceed to 640. At 640, one or more new port forwarding rules may be created at the first network extender to forward packets to the second client device. For example, a new port forwarding rule may be added on the first network extender, wherein the port forwarding rule provides that packets are to be forwarded to the IP address of the second client device.

Figure 7:
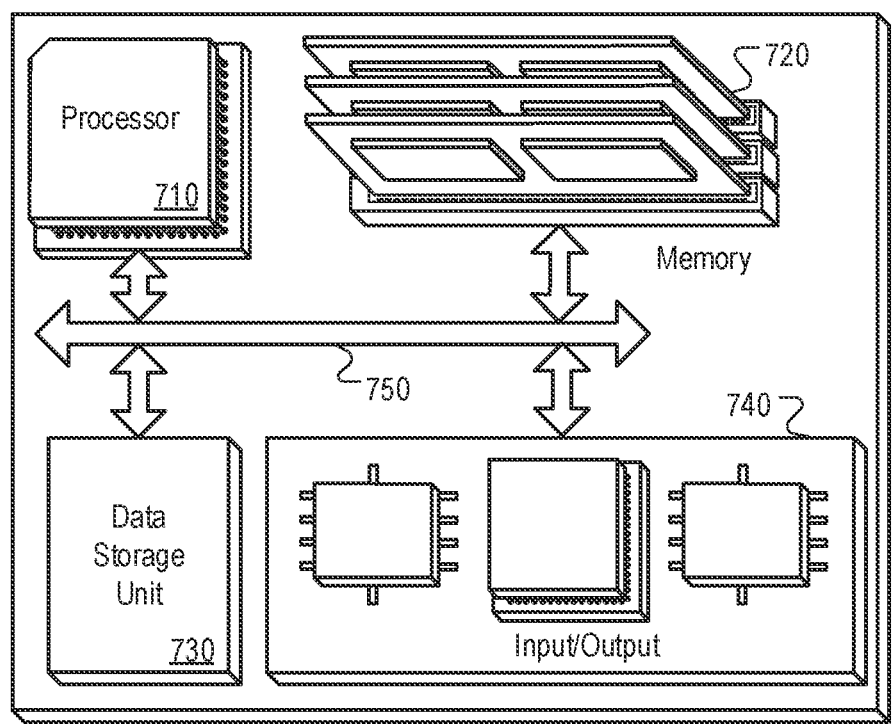
FIG. 7 is a block diagram of a hardware configuration operable to facilitate dynamic port forwarding.

FIG. 7 is a block diagram of a hardware configuration 700 operable to facilitate dynamic port forwarding. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In one implementation, the input/output device 740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 105 of FIG. 1 (e.g., television, mobile device, tablet, computer, game console, STB, etc.) or network extender 125 of FIG. 1. In another implementation, the input/output device can include driver devices configured to send communications to, and receive communications from one or more networks (e.g., provider network 120 of FIG. 1, WAN 115 of FIG. 1, local network, etc.).

Those skilled in the art will appreciate that the invention improves upon methods and systems for modifying port forwarding rules. Methods, systems, and computer readable media can be operable to facilitate dynamic port forwarding. A CPE device may be configured to dynamically modify one or more port forwarding rules based upon a detection of changes at the CPE device, one or more client devices, and/or a local network that is supported by the CPE device. In response to a steering of a client device to a network extender, the CPE device may amend port forwarding rules to forward traffic from the CPE device to the network extender for delivery to the client device. In response to a detection of a low quality parameter value for a first client device, the CPE device may amend port forwarding rules to forward traffic associated with the first client device to a second client device, wherein the second client device is identified as a device supporting interchangeable services with the first client device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method by a first customer premise equipment device comprising:
   monitoring a quality parameter of a first client device, wherein the first client device is connected to the first customer premise equipment device within a local network;
   determining that the quality parameter of the first client device is less than a quality parameter threshold;
   determining that a service provided by the first client device is designated at the first customer premise equipment device as an interchangeable service, wherein said designation is based upon an indication that the service may be provided by the first client device and at least one other client device, and wherein said designation is based upon the at least one other client device being configured to support a communication protocol associated with the service provided by the first client device;
   identifying a second client device through which the service that is designated as an interchangeable service may be provided;
   amending port forwarding rules to enable the second client device to provide the service; and
   port forwarding incoming packets associated with the service to the second client device.

2. The method of claim 1, further comprising:
   determining that a quality parameter of the second client device is greater than a quality parameter threshold; and
   wherein the incoming packets associated with the service provided by the first client device are port forwarded to the second client device in response to the determination that the quality parameter of the second client device is greater than the quality parameter threshold.

3. The method of claim 1, further comprising:
   steering the first client device to a first network extender; and
   modifying one or more port forwarding rules at the first customer premise equipment device by replacing a destination address with an address associated with the first network extender.

4. The method of claim 3, further comprising:
   creating a new port forwarding rule at the first network extender to forward incoming packets received at the first network extender to the first client device.

5. The method of claim 3, wherein the interchangeable service associated with a service provided by the first client device is identified in response to a determination that a quality parameter of the first client device is less than a quality parameter threshold after steering the first client device to the first network extender.

6. The method of claim 5, wherein the quality parameter of the first client device after steering the first client device to the first network extender is received by the first customer premise equipment device as a communication that is output from the first network extender.

7. The method of claim 1, wherein port forwarding incoming packets associated with the service provided by the first client device to the second client device comprises amending one or more port forwarding rules by changing a forwarding destination address from an address associated with the first client device to an address associated with the second client device.

8. A customer premise equipment device that:
   monitors a quality parameter of a first client device, wherein the first client device is connected to the customer premise equipment device within a local network;
   determines that the quality parameter of the first client device is less than a quality parameter threshold;
   determines that a service provided by the first client device is designated as-at the first customer premise equipment device as an interchangeable service, wherein said designation is based upon an indication that the service may be provided by the first client device and at least one other client device, and wherein said designation is based upon the at least one other client device being configured to support a communication protocol associated with the service provided by the first client device;
   identifies a second client device through which the service that is designated as an interchangeable service may be provided;
   amends port forwarding rules to enable the second client device to provide the service; and
   port forwards incoming packets associated with the service to the second client device.

9. The customer premise equipment device of claim 8, wherein the customer premise equipment device further:
   determines that a quality parameter of the second client device is greater than a quality parameter threshold; and
   wherein the incoming packets associated with the service provided by the first client device are port forwarded to the second client device in response to the determination that the quality parameter of the second client device is greater than the quality parameter threshold.

10. The customer premise equipment device of claim 8, wherein the customer premise equipment device further:
    steers the first client device to a first network extender; and
    modifies one or more port forwarding rules at the customer premise equipment device by replacing a destination address with an address associated with the first network extender.

11. The customer premise equipment device of claim 10, wherein the interchangeable service associated with a service provided by the first client device is identified in response to a determination that a quality parameter of the first client device is less than a quality parameter threshold after steering the first client device to the first network extender.

12. The customer premise equipment device of claim 11, wherein the quality parameter of the first client device after steering the first client device to the first network extender is received by the customer premise equipment device as a communication that is output from the first network extender.

13. The customer premise equipment device of claim 8, wherein port forwarding incoming packets associated with the service provided by the first client device to the second client device comprises amending one or more port forwarding rules by changing a forwarding destination address from an address associated with the first client device to an address associated with the second client device.

14. One or more non-transitory computer readable media having instructions operable to cause one or more processors of a first customer premise device to perform the operations comprising:
  monitoring a quality parameter of a first client device, wherein the first client device is connected to the first customer premise equipment device within a local network;
  determining that the quality parameter of the first client device is less than a quality parameter threshold;
  determining that a service provided by the first client device is designated at the first customer premise equipment device as an interchangeable service, wherein said designation is based upon an indication that the service may be provided by the first client device and at least one other client device, and wherein said designation is based upon the at least one other client device being configured to support a communication protocol associated with the service provided by the first client device;
  identifying a second client device through which the service that is designated as an interchangeable service may be provided; and
  amending port forwarding rules to enable the second client device to provide the service;
  port forwarding incoming packets associated with the service to the second client device.

15. The one or more non-transitory computer-readable media of claim 14, wherein the instructions are further operable to cause one or more processors to perform the operations comprising:
  determining that a quality parameter of the second client device is greater than a quality parameter threshold; and
  wherein the incoming packets associated with the service provided by the first client device are port forwarded to the second client device in response to the determination that the quality parameter of the second client device is greater than the quality parameter threshold.

16. The one or more non-transitory computer-readable media of claim 14, wherein the instructions are further operable to cause one or more processors to perform the operations comprising:
  steering the first client device to a first network extender; and
  modifying one or more port forwarding rules at the first customer premise equipment device by replacing a destination address with an address associated with the first network extender.

17. The one or more non-transitory computer-readable media of claim 16, wherein the instructions are further operable to cause one or more processors to perform the operations comprising:
  creating a new port forwarding rule at the first network extender to forward incoming packets received at the first network extender to the first client device.

18. The one or more non-transitory computer-readable media of claim 16, wherein the interchangeable service associated with a service provided by the first client device is identified in response to a determination that a quality parameter of the first client device is less than a quality parameter threshold after steering the first client device to the first network extender.

19. The one or more non-transitory computer-readable media of claim 18, wherein the quality parameter of the first client device after steering the first client device to the first network extender is received by the first customer premise equipment device as a communication that is output from the first network extender.

20. The one or more non-transitory computer-readable media of claim 14, wherein port forwarding incoming packets associated with the service provided by the first client device to the second client device comprises amending one or more port forwarding rules by changing a forwarding destination address from an address associated with the first client device to an address associated with the second client device.

* * * * *